(12) United States Patent
Mori et al.

(10) Patent No.: US 6,667,103 B1
(45) Date of Patent: Dec. 23, 2003

(54) WET FRICTION MATERIAL

(75) Inventors: Masahiro Mori, Shizuoka (JP); Hirokazu Yagi, Shizuoka (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/570,015

(22) Filed: May 12, 2000

(30) Foreign Application Priority Data

May 14, 1999 (JP) .......................................... 11-135059

(51) Int. Cl.$^7$ ................................................. B32B 9/04
(52) U.S. Cl. ........................ 428/447; 428/391; 523/149; 523/209; 523/216; 524/14; 524/15; 524/16
(58) Field of Search ................................ 428/391, 375, 428/447, 452; 523/149, 209, 216; 524/14, 15, 16, 492, 430; 162/80, 164.4; 188/264 E

(56) References Cited

U.S. PATENT DOCUMENTS

| | | | | |
|---|---|---|---|---|
| 4,749,614 A | * | 6/1988 | Andrews et al. | ............. 428/290 |
| 5,444,110 A | * | 8/1995 | Kitazawa et al. | ............. 524/100 |
| 5,824,413 A | * | 10/1998 | Schell | ......................... 428/378 |
| 6,265,066 B1 | * | 7/2001 | Suzuki et al. | ............... 428/391 |

FOREIGN PATENT DOCUMENTS

JP      59-080539     *   5/1984

OTHER PUBLICATIONS

Full English translation, JP 59–080539, Aisin Chem. Co. Limited, Publication date May 10, 1984.*

* cited by examiner

*Primary Examiner*—Robert Dawson
*Assistant Examiner*—Christopher M. Keehan
(74) *Attorney, Agent, or Firm*—Sughrue Mion, PLLC

(57) ABSTRACT

There is provided a wet friction material excellent in heat resistance and durability, high in friction coefficient, small in initial fluctuation of the friction coefficient, excellent in heat spot resistance and superior in physical strength to a wet friction material using a phenol resin as a binder. In the wet friction material composed of a fiber base material, a filler, a friction adjustor, and a binder, the binder is a hardened substance of a hydrolyzed solution of a silane coupling agent represented by the following formula (1)

$$(R^1)(R^2)_n Si(OR^3)_{3-n} \tag{1}$$

in which $R^1$ represents an alkylamino group containing primary amine at a terminal, each of $R^2$ and $R^3$ represents an alkyl group containing 1 to 3 carbon atoms, and n represents an integer of 0 or 1.

5 Claims, 3 Drawing Sheets

WET FRICTION MATERIAL

BACKGROUND OF THE INVENTION

1. Field of the Invention

The present invention relates to a wet friction material used in a frictional engagement device such as a clutch or a brake, used in oil in an automatic transmission or the like, for a vehicle such as a car.

2. Background Art

An automatic transmission in a vehicle such as a car generally includes a multiple disk clutch in which a plurality of friction plates each having a wet friction material bonded to a surface of a metal substrate (core plate) and a plurality of separator plates as a subject material of friction each constituted by a single plate or the like such as a metal plate are disposed alternately. In an ATF (automatic transmission fluid) used as lubricating oil, these plates are frictionally connected/disconnected to/from one another so that driving force is transmitted/released.

A paper type wet friction material called "paper friction material" is generally used as the wet friction material used in the frictional engagement device used in such oil. The wet friction material is generally produced by the steps of: making wet paper from a fiber base material of natural pulp fiber, organic synthetic fiber, inorganic fiber, etc. and a filler and friction adjustor such as diatomaceous earth, cashew gum, etc.; impregnating the wet paper with a resin binder of a heat-curable resin; and thermally hardening the wet paper.

In the aforementioned paper type wet friction material, the heat-curable resin used as a resin binder with which the paper body is impregnated has not only a function of binding and holding the fiber base material and the filler, etc. but also a strong influence on friction property, abrasion resistance, etc. of the wet friction material. Hence, an unmodified phenol resin was heretofore mainly used as the resin binder because the unmodified phenol resin was excellent in heat resistance, high in physical strength and relatively good in abrasion resistance.

Incidentally, reduction in weight of various kinds of parts and increase in efficiency thereof have been promoted in pursuit of energy saving and weight reduction in the recent car industry. On the other hand, a car engine has a tendency to be increased in its rotational speed and output. Also in the automatic transmission, the wet friction material has been required to be enhanced in friction coefficient and to be more greatly improved in heat resistance and durability to be adapted for reduction in size and weight of the frictional engagement device and increase in rotational speed and output of the car engine. Incidentally, the background-art wet friction material using an unmodified phenol resin as a binder was high in crosslink density and hard. Hence, the local butting of a frictional surface of the wet friction material made the initial fluctuation of the friction coefficient large so that the friction coefficient was small initially but increased because of the conformability of the frictional surface as the frictional surface was used. Moreover, under the condition of high temperature and high load, burnt portions, called heat spots, due to the high temperature of the frictional surface were generated in the object of friction (separator plate). Hence, there was a problem that long-term stability in friction property was insufficient. The problem needed to be solved.

To solve the aforementioned problems, there have been investigated various kinds of resins such as a silicone resin, etc. other than a modified phenol resin and a phenol resin. Of the various kinds of resins, the silicone resin heretofore investigated as a binder for the friction material mainly uses organochlorosilanes as its raw material. In addition to excellent heat resistance and durability due to main skeleton siloxane bond, the silicone resin is considered an excellent material, in place of the phenol resin, as a binder for the paper type wet friction material because characteristic in a wide range of from flexibility to rigidity can be exhibited by adjustment of crosslink density due to the design of mix of organochlorosilanes as a raw material. The silicone resin is, however, inferior to the phenol resin in permeability and wettability to the paper base material having fine porosity because the silicone resin is generally composed of an organic material and an inorganic material. Accordingly, the paper type wet friction material using the aforementioned silicone resin as a binder lacks physical strength. No satisfactory wet friction material has ever been obtained and has ever been put into practical use.

SUMMARY OF THE INVENTION

Therefore, an object of the present invention is to provide a wet friction material excellent in heat resistance and durability, high in friction coefficient, small in initial fluctuation of the friction coefficient, excellent in heat spot resistance and superior in physical strength to a wet friction material using a phenol resin as a binder.

To solve the aforementioned problem, the inventors of the present invention have eagerly investigated the hydrolyzed solution of a silane coupling agent with attention paid to the fact that the silane coupling agent is widely used for improving performance of a composite material containing an organic polymer and an inorganic and/or metal material. The silane coupling agent is represented by the general formula $Y-SiX_3$ in which Y shows a reactive organic functional group represented by an amino group, an epoxy group, a vinyl group, a methacryl group or a mercapto group, and X shows a hydrolyzable group represented by an alkoxy group. The mechanism of action of the silane coupling agent is as follows. The hydrolyzable group X, for example, an alkoxy group reacts with water to produce a silanol group to be bonded to a hydroxy group in a surface of the inorganic material. On the other hand, the reactive organic functional group Y, for example, an amino group reacts with a reactive group contained in the organic polymer, so that the two groups are chemically (covalently) bonded to each other. That is, the silane coupling agent acts as an intermediary between the inorganic material and the organic material to thereby effectuate enhancement of physical strength, enhancement of the affinity of the inorganic material for the organic resin, suppression of lowering of physical strength under the condition of high temperature and high humidity, and so on. For application of the silane coupling agent having the aforementioned characteristic to a paper type wet friction material, the silane coupling agent must be particularly excellent in permeability and wettability to a paper base material having fine porosity because the wet friction material needs to be impregnated with a binder uniformly as a whole. The inventors have eagerly investigated the hydrolyzed solution of such a silane coupling agent from this point of view. As a result, they have found that a silane coupling agent represented by the general formula $Y-SiX_3$ is particularly excellent in permeability and wettability to the paper base material when Y and X are an amino group and an alkoxy group, respectively. Thus, they have accomplished the present invention.

That is, according to the present invention, there provided a wet friction material comprising a fiber base material, a filler, a friction adjustor, and a binder; the binder is constituted by a hardened substance of a hydrolyzed solution of a silane coupling agent represented by the formula (2)

$$(R^1)(R^2)_n Si(OR^3)_{3-n} \qquad (2)$$

in which $R^1$ represents an alkylamino group containing primary amine at a terminal, each of $R^2$ and $R^3$ represents an alkyl group containing 1 to 3 carbon atoms, and n represents an integer of 0 or 1.

Here, the silane coupling agent is constituted by a silane coupling agent containing three hydrolyzable groups in one molecule or by a mixture of a silane coupling agent containing three hydrolyzable groups in one molecule and a silane coupling agent containing two hydrolyzable groups in one molecule.

Preferably, when the silane coupling agent is constituted by a mixture of a silane coupling agent (n=0) containing three hydrolyzable groups in one molecule and a silane coupling agent (n=1) containing two hydrolyzable groups in one molecule, the hydrolyzed solution of the silane coupling agent is prepared so that the molar ratio of the silane coupling agent containing two hydrolyzable groups in one molecule to the silane coupling agent containing three hydrolyzable groups in one molecule is not higher than 10.

Further preferably, the hydrolyzed solution of the silane coupling agent contains water with an amount not smaller than the amount permitting hydrolyzing for half the number of hydrolyzable groups contained in the silane coupling agent but not larger than twice as much as the amount permitting hydrolyzing for all the number of hydrolyzable groups contained in the saline coupling agent.

DETAILED DESCRIPTION OF THE PREFERRED EMBODIMENTS

Figure 1:
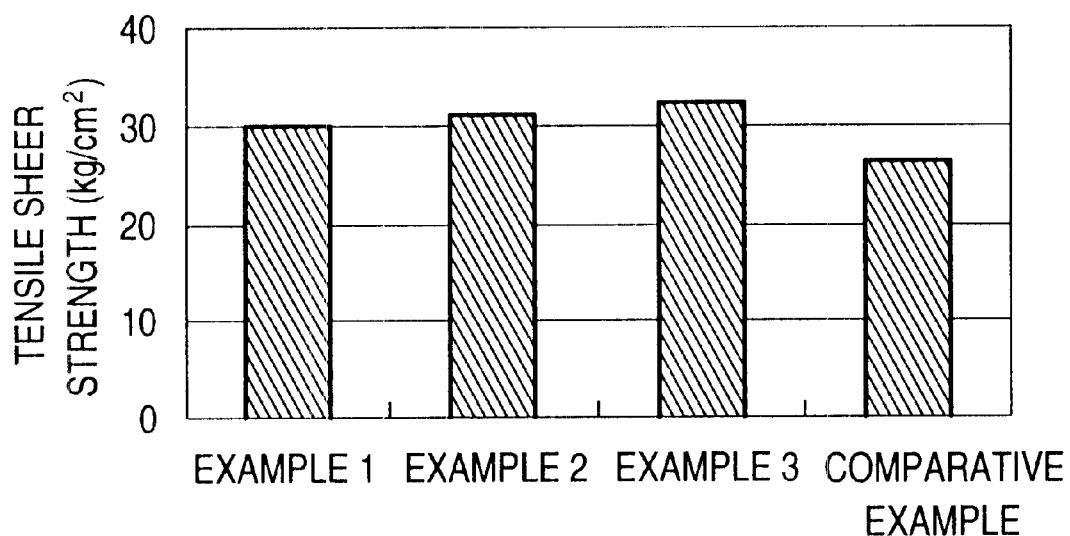
FIG. 1 is a graph for comparing tensile shear strengths of friction materials.

Embodiments of the present invention will be described below specifically. A wet friction material according to the present invention is composed of a fiber base material, a filler, a friction adjustor, and a binder. A hardened substance of a hydrolyzed solution of a silane coupling agent is used as the binder. A heretofore available base material such as natural pulp fiber like wood pulp, organic synthetic fiber like aramid, or inorganic fiber like glass, may be used as the fiber base material. Heretofore available agents such as diatomaceous earth, cashew gum, etc. may be used as the filler and the friction adjustor. The materials for the filler and the friction adjustor may be different or the same if they have both functions. The amount of the filler is not limiting, but is preferably from 0 to 80% by weight, more preferably from 1 to 80% by weight, based on a paper body. The amount of the filler is not limiting, but is preferably from 0 to 80% by weight, more preferably from 1 to 80% by weight, based on a paper body.

In the present invention, the hydrolyzed solution of the silane coupling agent as a base of the binder is prepared by putting a silane coupling agent as a main raw material, water and a solvent, if necessary, in a reactor and by stirring the mixture at room temperature or at a relatively low temperature (not higher than the boiling point of the solvent (lower alcohol); for example, about 40° C. to about 50° C.) for a predetermined time (for example, about 3 hours to about 5 hours).

As the silane coupling agent, used is aminosilane which is excellent in permeability and wettability to the paper base material and which is represented by the formula (3):

$$(R^1)(R^2)_n Si(OR^3)_{3-n} \qquad (3)$$

in which $R^1$ shows an alkylamino group containing primary amine at a terminal, each of $R^2$ and $R^3$ shows an alkyl group containing 1 to 3 carbon atoms, and n shows an integer of 0 or 1.

Specifically, examples of aminosilane containing three alkoxy groups in one molecule include 3-aminopropyl trimethoxysilane, 3-aminopropyl triethoxysilane, N-2-(aminoethyl) 3-aminopropyl trimethoxysilane, etc. One kind selected from these may be used or a mixture of two or more kinds selected from these may be used. On the other hand, examples of aminosilane containing two alkoxy groups in one molecule include 3-aminopropyl methyl dimethoxysilane, 3-aminopropyl methyl diethoxysilane, N-2-(aminoethyl) 3-aminopropylmethyl dimethoxysilane, N-2-(aminoethyl) 3-aminopropylmethyl diethoxysilane, etc. One kind selected from these may be used or a mixture of two or more kinds selected from these may be used.

Aminosilane (n=0) containing three alkoxy groups in one molecule may be used singly or a mixture of aminosilane (n=0) containing three alkoxy groups in one molecule and aminosilane (n=1) containing two alkoxy groups in one molecule may be used.

When a mixture of aminosilane containing three alkoxy groups in one molecule and aminosilane containing two alkoxy groups in one molecule is used, the two kinds of aminosilane are preferably mixed so that the molar ratio of the aminosilane containing two alkoxy groups in one molecule to the aminosilane containing three alkoxy groups in one molecule is not higher than 10. If the molar ratio is higher than 10, the hardened substance is so low in crosslink density that heat resistance becomes insufficient undesirably.

The amount of water to be added is not smaller than the amount permitting hydrolyzing for half the number of hydrolyzable groups (alkoxy groups) contained in the silane coupling agent (aminosilane) but not larger than twice as much as the amount permitting hydrolyzing for all the number of hydrolyzable groups contained in the silane coupling agent. Preferably, the amount of water to be added is not smaller than the amount permitting hydrolyzing for half the number of hydrolyzable groups (alkoxy groups) contained in the silane coupling agent (aminosilane) but not larger than the amount permitting hydrolyzing for all the number of hydrolyzable groups contained in the silane coupling agent. If the amount of water is smaller than the amount permitting hydrolyzing for half the number of hydrolyzable groups, a large number of unreacted alkoxy groups remain in the hydrolyzed solution so that hardenability is worsened. This is undesirable from the point of view of productivity and energy saving as well. If the amount of water to be added is contrariwise too large, an excessive amount of water remains in the hydrolyzed solution to cause a phenomenon that the resin component concentration increases from the inside toward the surface layer in the case of curing by heat. As a result, the amount of the hardened substance becomes uneven in a direction of the thickness of the friction material, so that the unevenness has a bad influence on physical strength and friction property. If the amount of water to be added is larger than twice as much as the amount permitting hydrolyzing for all the number of hydrolyzable groups (alkoxy groups), an excessively large amount of water remains in the hydrolyzed solution so that the aforementioned phenomenon becomes remarkable undesirably. If the amount of water to be added is larger than the amount permitting hydrolyzing for all the number of hydrolyzable groups (alkoxy groups), an excessive amount of water remains in the hydrolyzed solution so that the aforementioned phenomenon occurs but the degree thereof is in a permissible range. When the amount of water to be added is set to be not larger than the amount permitting hydrolyzing for all the number of hydrolyzable groups (alkoxy groups), the amount of water remaining in the hydrolyzed solution is so small that a uniform friction material can be obtained preferably.

The solvent is not always essentially required but is generally used for homogenizing aminosilane and water in a starting mixture solution. For example, aminosilane in the starting mixture solution is preferably diluted with lower alcohol such as methanol, ethanol, propanol, or the like, so that the aminosilane concentration is not higher than 80% by weight. If the aminosilane concentration is higher than 80% by weight, a condensation reaction of silanol groups produced by hydrolysis is accelerated so that storage stability of the hydrolyzed solution may be spoiled.

For production of the wet friction material according to the present invention, first, a paper body is prepared. The paper body is not specifically limited. For example, a fiber base material such as a natural pulp fiber like wood pulp, an organic synthetic fiber like aramid, or an inorganic fiber like glass, and a filler/friction adjustor such as diatomaceous earth, cashew gum, etc. are dispersed in water with a predetermined mixture ratio so that a slurry is prepared. The slurry is subjected to paper-making and drying by an ordinary method so that a paper body is prepared. The paper body is impregnated with the hydrolyzed solution of aminosilane by 20 to 120 parts by weight per 100 parts by weight of the base material. After the paper body is dried, the paper body is heated at a temperature of from about 100° C. to about 200° C. for a time of from 15 to 30 minutes so as to be hardened. Thus, a wet friction material is obtained. Then, the wet friction material may be punched into a predetermined shape and integrated with an adhesive-coated substrate (core plate) by means of hot press so that a friction plate can be obtained. The means is not specifically limited but may be replaced by another means.

The silane coupling agent (aminosilane) is hydrolyzed into a compound having a silanol group and an amino group in one and the same molecule. Because the bipolar ion structure of the amino group in one molecule suppresses condensation polymerization of silanol groups, the compound is provided as a relatively stable solution. After the low-molecular-weight hydrophilic compound permeates capillary space of the paper base material well, a condensation polymerization reaction of silanol groups is repeated by evaporation and heating of a solvent. As a result, siloxane bonds are formed so that the compound is hardened. Accordingly, organic and inorganic components of the paper base material are firmly bonded to each other, so that physical strength more excellent than that of the phenol resin is exhibited. Moreover, the hardened substance has siloxane bond (—O—Si—O—) as a main skeleton. The siloxane bond is long in interatomic distance between a silicon atom and an adjacent oxygen atom and low in electron density. Hence, the bond can be rotated easily, so that the hardened substance is rich in flexibility and soft. When the hardened substance of the hydrolyzed solution of aminosilane is used as a binder for the wet friction material, the contact area of the surface of the friction material is increased by enhancement of flexibility. As a result, burnt portions, called heat spots, due to local butting can be eliminated from the object of friction (separator plate). Moreover, the initial fluctuation of the friction coefficient is so slight that a high and stable friction coefficient can be exhibited. On the other hand, the bond energy of Si—O in the siloxane bond is far larger than the bond energy of C—C forming a main skeleton of the organic resin such as a phenol resin because the bond energy of Si—O is 106 kcal/mol whereas the bond energy of C—C is 85 kcal/mol. The large bond energy prevents the hardened substance of the hydrolyzed solution of aminosilane from deterioration such as decomposition, discoloration, etc. even in the case where the hardened substance is left at a high temperature for a long time. Hence, the hardened substance of the hydrolyzed solution of aminosilane is stable to frictional heat generated in the frictional surface so that heat resistance and durability of the wet friction material can be enhanced greatly.

The present invention will be described below more specifically on the basis of embodiments thereof, but the embodiments are shown by way of example so as not to limit the present invention.

Preparation of Paper Body

A mixture containing 35% by weight of cellulose fiber and 20% by weight of aramid fiber as fiber base material components and containing 45% by weight of diatomaceous earth as a friction adjustor/filler was dispersed in water so that a slurry was prepared. The slurry was subjected to a paper-making and drying process so that a paper body was prepared.

EXAMPLE 1

Into 221 parts by weight of 3-aminopropyl triethoxysilane, 93 parts by weight of ethanol and 54 parts by weight of water were added and the mixture solution underwent a reaction at 40° C. for 5 hours so that a hydrolyzed solution of 3-aminopropyl triethoxysilane was produced. The aforementioned paper body was impregnated with the solution diluted with ethanol. Then, the paper body was dried and heated at 150° C. for 30 minutes so as to be hardened. Thus, a wet friction material containing 40 parts by weight of a binder per 100 parts by weight of the paper body was produced. Then, the wet friction material was punched into the form of a ring with an outer diameter of 130 mm and an inner diameter of 100 mm and kept in a mold heated at 200° C. under a pressure of not lower than 50 kg/cm$^2$ for 30 seconds so as to be integrated with a ring-like metal core plate. Thus, a friction plate with a diameter of 130 mm and a thickness of 2.3 mm was produced.

EXAMPLE 2

Into a mixture solution of 103 parts by weight of N-2-(aminoethyl) 3-aminopropylmethyl dimethoxysilane and 111 parts by weight of N-2-(aminoethyl) 3-aminopropyl trimethoxysilane, 98 parts by weight of methanol and 45 parts by weight of water were added, and the mixture solution underwent a reaction at room temperature for 3 hours so that a hydrolyzed solution of N-2-(aminoethyl) 3-aminopropylmethyl dimethoxysilane and N-2-

(aminoethyl) 3-aminopropyl trimethoxysilane was produced. The aforementioned paper body was impregnated with the solution diluted with methanol. Then, the paper body was dried and heated at 150° C. for 30 minutes so as to be hardened. Thus, a wet friction material containing 40 parts by weight of a binder per 100 parts by weight of the paper body was produced. Then, a friction plate with a diameter of 130 mm and a thickness of 2.3 mm was produced in the same manner as in Example 1.

EXAMPLE 3

Into a mixture solution of 185 parts by weight of N-2-(aminoethyl) 3-aminopropylmethyl dimethoxysilane and 22 parts by weight of N-2-(aminoethyl) 3-aminopropyl trimethoxysilane, 101 parts by weight of methanol and 38 parts by weight of water were added, and the mixture solution underwent a reaction at room temperature for 3 hours so that a hydrolyzed solution of N-2-(aminoethyl) 3-aminopropylmethyl dimethoxysilane and N-2-(aminoethyl) 3-aminopropyl trimethoxysilane was produced. The aforementioned paper body was impregnated with the solution diluted with methanol. Then, the paper body was dried and heated at 150° C. for 30 minutes so as to be hardened. Thus, a wet friction material containing 40 parts by weight of a binder per 100 parts by weight of the paper body was produced. Then, a friction plate with a diameter of 130 mm and a thickness of 2.3 mm was produced in the same manner as in Example 1.

Comparative Example

Into 1000 parts by weight of phenol, 1050 parts by weight of 37% formalin and 10 parts by weight of 20% sodium hydroxide were added, and the mixture solution underwent a reaction at 100° C. for an hour. Then, the resulting solution was dewatered under a vacuum of 650 mmHg. When the temperature of the solution reached 70° C., 750 parts by weight of methanol were added to the solution so that a liquid unmodified phenol resin containing 50% of a non-volatile component was produced. The aforementioned paper body was impregnated with the resin diluted with methanol. Then, the paper body was dried and heated at 150° C. for 30 minutes so as to be hardened. Thus, a wet friction material containing 40 parts by weight of resin per 100 parts by weight of the paper body was produced. Then, a friction plate with a diameter of 130 mm and a thickness of 2.3 mm was produced in the same manner as in Example 1.

Evaluation Test

Tensile Shear Strength

Each of the friction plates produced in Examples 1 to 3 and Comparative Example was cut into a sample piece with an arc length of about 20 mm. Iron plates each 100 mm long, 25 mm wide and 1.6 mm thick were bonded onto opposite surfaces of the sample piece. In this condition, the tensile shear strength of each of the wet friction materials was measured at room temperature. FIG. 1 shows results of the measurement. It is obvious from FIG. 1 that the wet friction materials in Examples 1 to 3 are superior in physical strength to that in Comparative Example.

Initial Fluctuation of Dynamic Friction Coefficient

Figure 2:
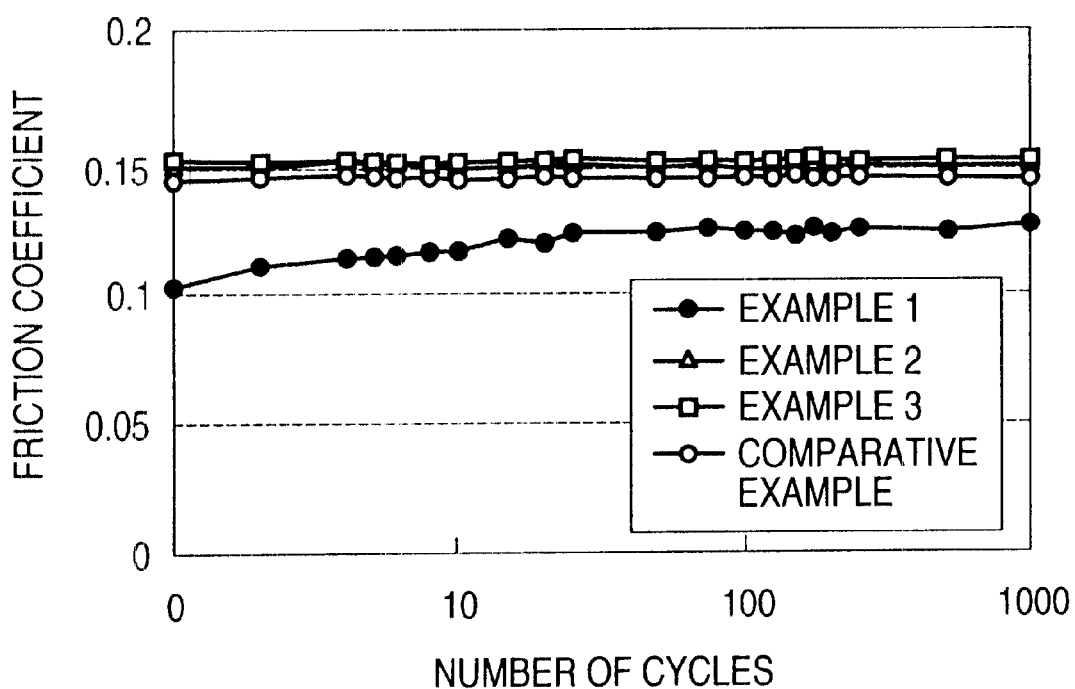
FIG. 2 is a graph showing a state of the change of the friction coefficient of each friction material in the initial number of cycles.

The initial fluctuation of the dynamic friction coefficient in each of the wet friction materials produced in Examples 1 to 3 and Comparative Example was measured in the test condition 1 shown in Table 1 by use of a frictional performance tester (SAE No. 2). FIG. 2 shows results of the measurement.

TABLE 1

| Item | Test Condition 1 |
| --- | --- |
| Rotational Speed (rpm) | 3600 |
| Inertia (kg.m) | 0.343 |
| Surface Pressure (kPa) | 785 |
| Oil Temperature (° C.) | 100 |
| Oil Quantity (cc) | 700 |

It is obvious from FIG. 2 that the friction coefficient of the friction material in Comparative Example is small for a small number of cycles and increases with the increase of the number of cycles but then becomes a constant value. On the other hand, the friction coefficient of each of the friction materials in Examples 1 to 3 is kept constant with little change from the initial value and exhibits a large value compared with Comparative Example. That is, it is obvious that the friction materials in Examples are excellent in initial conformability and large in friction coefficient.

Heat Spot Resistance Test

Each of the wet friction materials produced in Examples 1 to 3 and Comparative Example was subjected to a heat spot resistance test in the test condition 2 shown in Table 2 by use of the frictional performance tester (SEA No. 2).

TABLE 2

| Item | Test Condition 2 |
| --- | --- |
| Rotational Speed (rpm) | 7600 |
| Inertia (kg.m) | 0.123 |
| Surface Pressure (kPa) | 519.4 |
| Oil Temperature (° C.) | 100 |
| Oil Quantity (L/min) | 0.075 |
| Number of Cycles (Times) | 5 |

Figure 3:
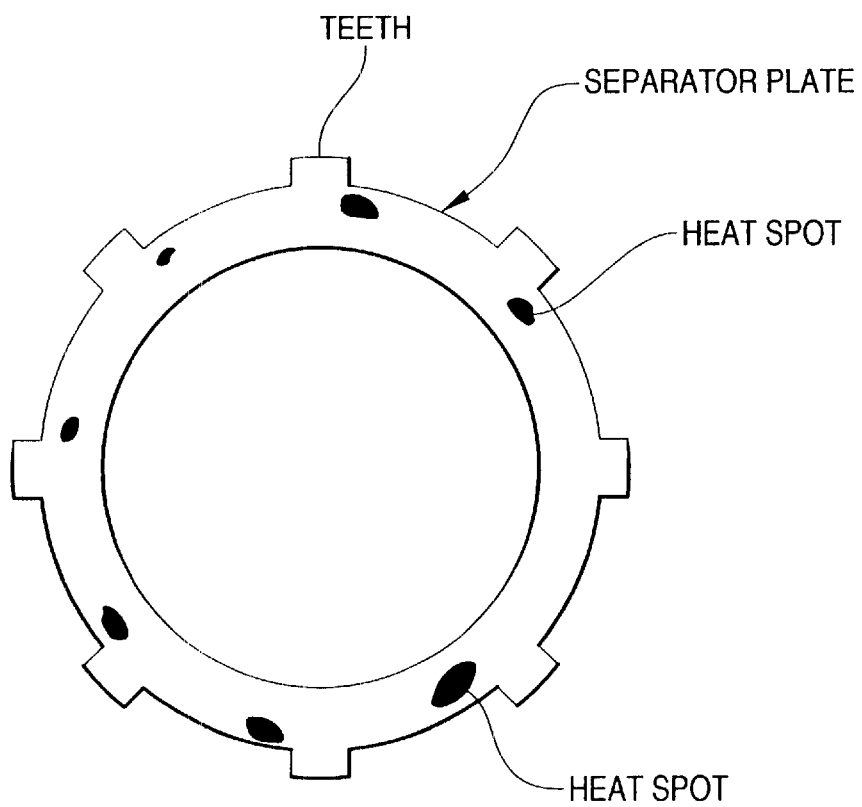
FIG. 3 is a front view of a material as an object of friction after a friction test under the condition shown in Table 2 with a friction material shown in Comparative Example.
Figure 4:
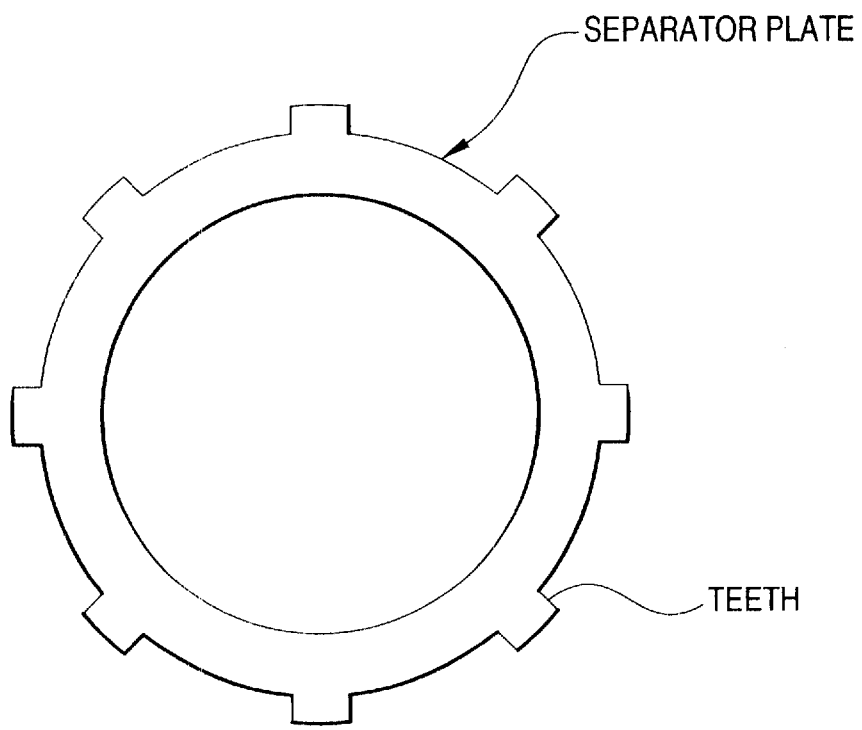
FIG. 4 is a front view of a material as an object of friction after a friction test under the condition shown in Table 2 with a friction material shown in each of Examples 1 to 3.

FIG. 3 shows a state of a material (separator plate) as an object of friction in the case where the friction material in Comparative Example is used. FIG. 4 shows a state of a material as an object of friction in the case where each of the friction materials in Examples 1 to 3 is used. A plurality of heat spots (blacking due to burning) were generated in Comparative Example as shown in FIG. 3 whereas there was no heat spot observed in Examples 1 to 3 as shown in FIG. 4. That is, it is obvious that the effect of suppressing heat spots is obtained by use of the friction materials produced in Examples 1 to 3. Incidentally, the number of cycles was measured so that frictional connection and disconnection was regarded as one cycle.

Durability Test

Figure 5:
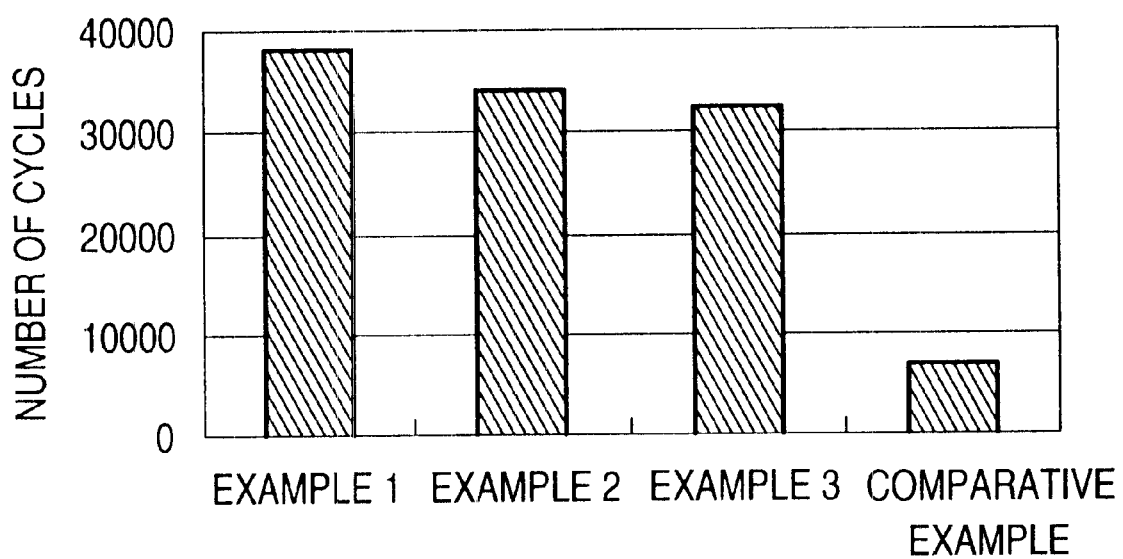
FIG. 5 is a graph for comparing lives (numbers of cycles) of the friction materials.

The durability (life) of each of the wet friction materials produced in Examples 1 to 3 and Comparative Example was evaluated in the test condition 3 shown in Table 3 by use of the frictional performance tester (SAE No. 2). FIG. 5 shows results of the evaluation. It is obvious from FIG. 5 that the life of each of the wet friction materials in Examples 1 to 3 is longer than that of the wet friction material in Comparative Example.

TABLE 3

| Item | Test Condition 3 |
| --- | --- |
| Rotational Speed (rpm) | 7600 |
| Inertia (kg.m) | 0.123 |
| Surface Pressure (kPa) | 519.4 |

TABLE 3-continued

| Item | Test Condition 3 |
| --- | --- |
| Oil Temperature (° C.) | 100 |
| Oil Quantity (L/min) | 0.36 |

As described above, the wet friction material according to the present invention uses a hardened substance of a hydrolyzed solution of a silane coupling agent (aminosilane) as a binder. Hence, there is obtained a wet friction material which is composed of an organic material component and an inorganic material component and which is excellent in permeability and wettability of the coupling agent to a paper base material having fine porosity and higher in physical strength than that of a wet friction material using a phenol resin as a binder. Moreover, the wet friction material has heat resistance and durability more excellent by far than those in the background-art case of use of an unmodified phenol resin. Moreover, the flexibility of the wet friction material can be enhanced compared with the case of use of such an unmodified phenol resin. Hence, the friction coefficient of the wet friction material is so high that initial conformability and heat spot resistance caused by the local butting of the wet friction material can be considerably improved. The wet friction material can be sufficiently adapted for reduction in size and weight of a frictional engagement device in an automatic transmission and increase in rotational speed and output of a car engine which have been required recently.

What is claimed is:

1. A wet friction material consisting essentially of a fiber base material, a filler, a friction adjustor, and a binder, wherein the binder is a hardened substance of a hydrolyzed solution of a silane coupling agent represented by the formula (1):

$$(R^1)(R^2)_n Si(OR^3)_{3-n} \quad (1)$$

where $R^1$ represents an alkylamino group containing primary amine at a terminal, $R^2$ and $R^3$ each independently represents an alkyl group containing 1 to 3 carbon atoms, and n represents an integer of 0 or 1.

2. A wet friction material according to claim 1, wherein the silane coupling agent is a silane coupling agent containing three hydrolyzable groups in one molecule, or a mixture of a silane coupling agent containing three hydrolyzable groups in one molecule and a silane coupling agent containing two hydrolyzable groups in one molecule.

3. A wet friction material according to claim 2, wherein, when the silane coupling agent is a mixture of a silane coupling agent containing three hydrolyzable groups in one molecule and a silane coupling agent containing two hydrolyzable groups in one molecule, the hydrolyzed solution of the silane coupling agent is prepared so that the molar ratio of the silane coupling agent containing two hydrolyzable groups in one molecule to the silane coupling agent containing three hydrolyzable groups in one molecule is not higher than 10.

4. A wet friction material according to claim 1, wherein the hydrolyzed solution of the silane coupling agent contains water with an amount not smaller than the amount permitting hydrolyzing for half the number of hydrolyzable groups contained in the silane coupling agent but not larger than twice as much as the amount permitting hydrolyzing for all the number of hydrolyzable groups contained in the saline coupling agent.

5. A wet friction material according to claim 2, wherein the silane coupling agent containing three hydrolyzable groups in one molecule is at least one of 3-aminopropyl trimethoxysilane, 3-aminopropyl triethoxysilane, and N-2-(aminoethyl) 3-aminopropyl trimethoxysilane, and the silane coupling agent containing two hydrolyzable groups in one molecule is at least one of 3-aminopropyl methyl dimethoxysilane, 3-aminopropyl methyl diethoxysilane, N-2-(aminoethyl) 3-aminopropylmethyl dimethoxysilane, and N-2-(aminoethyl) 3-aminopropylmethyl diethoxysilane.

* * * * *